United States Patent
Ping

(10) Patent No.: US 8,717,918 B2
(45) Date of Patent: May 6, 2014

(54) COMMUNICATION DEVICE AND DYNAMIC MANAGEMENT METHOD USING THE SAME

(75) Inventor: Hou-Qiang Ping, Shanghai (CN)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 165 days.

(21) Appl. No.: 13/164,762

(22) Filed: Jun. 20, 2011

(65) Prior Publication Data

US 2012/0039193 A1      Feb. 16, 2012

(30) Foreign Application Priority Data

Aug. 13, 2010   (CN) .......................... 2010 1 0253457

(51) Int. Cl.
*H04L 12/28*     (2006.01)
(52) U.S. Cl.
USPC ........................................................ 370/252
(58) Field of Classification Search
USPC ............................. 370/252, 395.2
See application file for complete search history.

(56) References Cited

U.S. PATENT DOCUMENTS

| | | | |
|---|---|---|---|
| 5,960,192 A * | 9/1999 | Yoshida ........................ | 713/502 |
| 2002/0133552 A1* | 9/2002 | Ooi et al. ...................... | 709/205 |
| 2005/0125525 A1* | 6/2005 | Zhou et al. .................... | 709/223 |
| 2005/0198298 A1* | 9/2005 | Nishikawa et al. ........... | 709/226 |
| 2008/0172664 A1* | 7/2008 | Nduaguba et al. ............ | 717/174 |
| 2011/0320519 A1* | 12/2011 | Rauma et al. ................. | 709/202 |
| 2012/0271854 A1* | 10/2012 | Truong et al. ................. | 707/785 |

FOREIGN PATENT DOCUMENTS

TW                574648 B2    2/2004

* cited by examiner

*Primary Examiner* — Warner Wong
(74) *Attorney, Agent, or Firm* — Novak Druce Connolly Bove + Quigg LLP

(57) ABSTRACT

A network device transmits and receives data packets between the network device and a network. The data packets includes information about a procedure needed in order to process the data packets. According to the information, the network device executes the procedure to process the data packets. If the time of the procedure has not been executed to process the data packets is more than a predetermined time and no other data packets are needed to be processed, the network device turns off the procedure automatically.

14 Claims, 3 Drawing Sheets

COMMUNICATION DEVICE AND DYNAMIC MANAGEMENT METHOD USING THE SAME

BACKGROUND

1. Technical Field

Embodiments of the present disclosure relate to network communication, and more particularly to a device and a dynamic management method for processing data packets.

2. Description of Related Art

Various protocols and services have been designed and are in use on the Internet to handle various types of communications. For example, file transfer protocol (FTP) for file transfer, and hypertext markup language (HTML) for web traffic. More memory space is needed for the various types of communications. Accordingly, a network device can be used to execute a number of procedures to handle various types of communications; however, the number of procedures occupies memory of the network device until the network device is turned off. What is needed, therefore, is a procedure management method using the device to overcome the limitations described.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
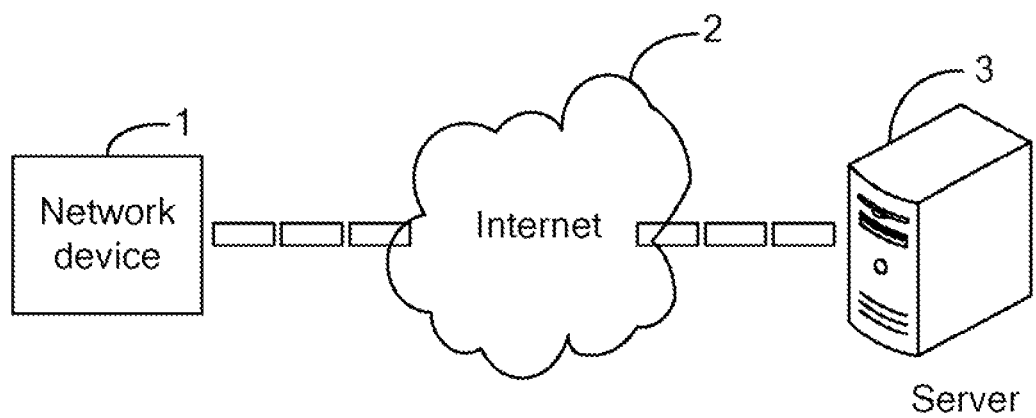
FIG. 1 is a schematic diagram of an exemplary network comprising a network device.

FIG. 1 is a schematic diagram of an exemplary network comprising a network device 1. The network device 1 communicates with a server through Internet 2. The network device 1 receives data packets from the Internet 2 and analyzes information of the data packets to determine which procedure to use in order to process the data packets. The information of the data packets includes information about the procedure. Upon detecting that the analyzed information of the data packets, the network device 1 executes a procedure corresponding to the data packets to process the data packets.

In general, the word "module", as used herein, refers to logic embodied in hardware or firmware, or to a collection of software instructions, written in a programming language, such as, Java, C, or assembly. One or more software instructions in the modules may be embedded in firmware, such as EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 2:
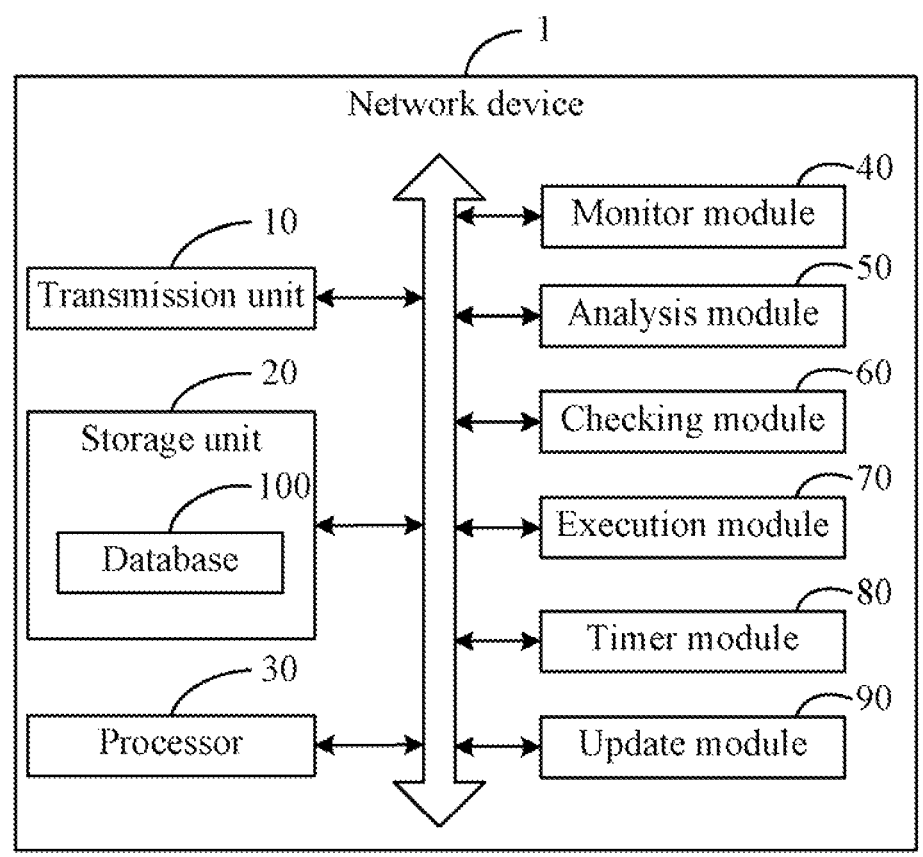
FIG. 2 is a block diagram of one embodiment of the network device of FIG. 1.

FIG. 2 is a block diagram of one embodiment of the network device 1. Depending on the embodiment, the network device 1 may be a hub, an accessing point, a network router or other device. The network device 1 includes a transmission unit 10, a storage unit 20, at least one processor 30, and one or more programs including a monitor module 40, an analysis module 50, a checking module 60, an execution module 70, a timer module 80, and an update module 90.

The network device 1 is generally controlled and coordinated by an operating system software, such as UNIX, LINUX, WINDOWS, MAC OS X, an embedded operating system, or any other compatible operating systems. In other embodiments, the network device 1 may be controlled by a proprietary operating system. Conventional operating systems control and schedule computer processes for execution, perform memory management, provide file system, networking, and I/O services, and provide a user interface, such as a graphical user interface (GUI), among other things.

The transmission unit 10 is operable to transmit and receive data packets between the network device 1 and the Internet 2. In one embodiment, the transmission unit 10 may be a WIFI module to transmit and receive data packets between the Internet 2 and the network device 1. In some embodiments, the transmission unit 10 may be a TCP/IP interface module to transmit and receive data packets between the Internet 2 and the network device 1.

The modules 40-90 may comprise computerized code in the form of one or more programs that are stored in the storage unit 20 (or memory). The computerized code includes instructions that are executed by the at least one processor 30 to provide functions for modules 40-90. The at least one processor 30, as an example, may include a CPU, math coprocessor, shift register, for example.

The storage unit 20 is electronically connected to the transmission unit 10, the at least one processor 30, the monitor module 40, the analysis module 50, the checking module 60, the execution module 70, the timer module 80 and the update module 90. The storage unit 20 includes a database 100 storing information of the procedure. In one embodiment, the information includes a title and a status of the procedure. For example, the status of the procedure may be a turn-on state or a turn-off state. The at least one processor 30 can execute the procedure according to the status of the procedure.

The storage unit 20 further stores many kinds of data, a customization function code of the network device 1, programs of an operating system and other software of the network device 1. The storage unit 20 may include a hard disk drive, flash memory, RAM, ROM, cache, or external storage mediums.

The monitor module 40 is operable to monitor a receiving and a transmission status of the transmission unit 10. In one embodiment, the monitor module 40 monitors the data packets received from the transmission unit 10, and further determines whether the data packets need to be processed. If the data packets need to be processed, the monitor module 40 sends a signal to the at least one processor 30 to execute the procedure corresponding to the data packets.

The analysis module 50 is operable to analyze information of the data packets to determine which procedure to use in order to process the data packets. The information of the data packets includes information about the procedure. For example, when the data packets are used for logging in the network device 1, the analysis module 50 determines an appropriate procedure associated with logging in the network device 1 to process the data packet.

The checking module 60 is operable to determine whether the database 100 stores information of the procedure to process the data packets. The information of the procedure includes the title and the status of the procedure. In one embodiment, if the checking module 60 determines the database 100 stores the title of the procedure, the checking module 60 further checks the status of the procedure. For example, the checking module 60 determines whether the status of the procedure is the turn-on state.

The execution module 70 is operable to execute the procedure to process the data packets. In one embodiment, if the procedure is the turn-off state and the procedure is needed to process the data packets, the procedure is turned on by the at least one processor 30 and the execution module 70 executes the procedure to process the data packets.

The timer module 80 is operable to set a predetermined time, calculate a time of the procedure that has not been executed to process the data packets, and determine whether the calculated time is more than the predetermined time. For example, the timer module 80 sets the predetermined time equal to about ten seconds. In one embodiment, if the calculated time is more than the predetermined time, the procedure is turned off.

The update module 90 is operable to update the status of the procedure to the database 100. For example, the status may be the turn-on state or the turn-off state. In one embodiment, when the checking module 60 determines no title of the procedure for processing the data packets is stored in the database 100, the update module 90 updates the turn-off state of the procedure to the database 100.

In other embodiments, when the checking module 60 determines one title of the procedure for processing the data packets is stored in the database 100, the update module 90 updates the turn-on state of the procedure to the database 100.

Figure 3:
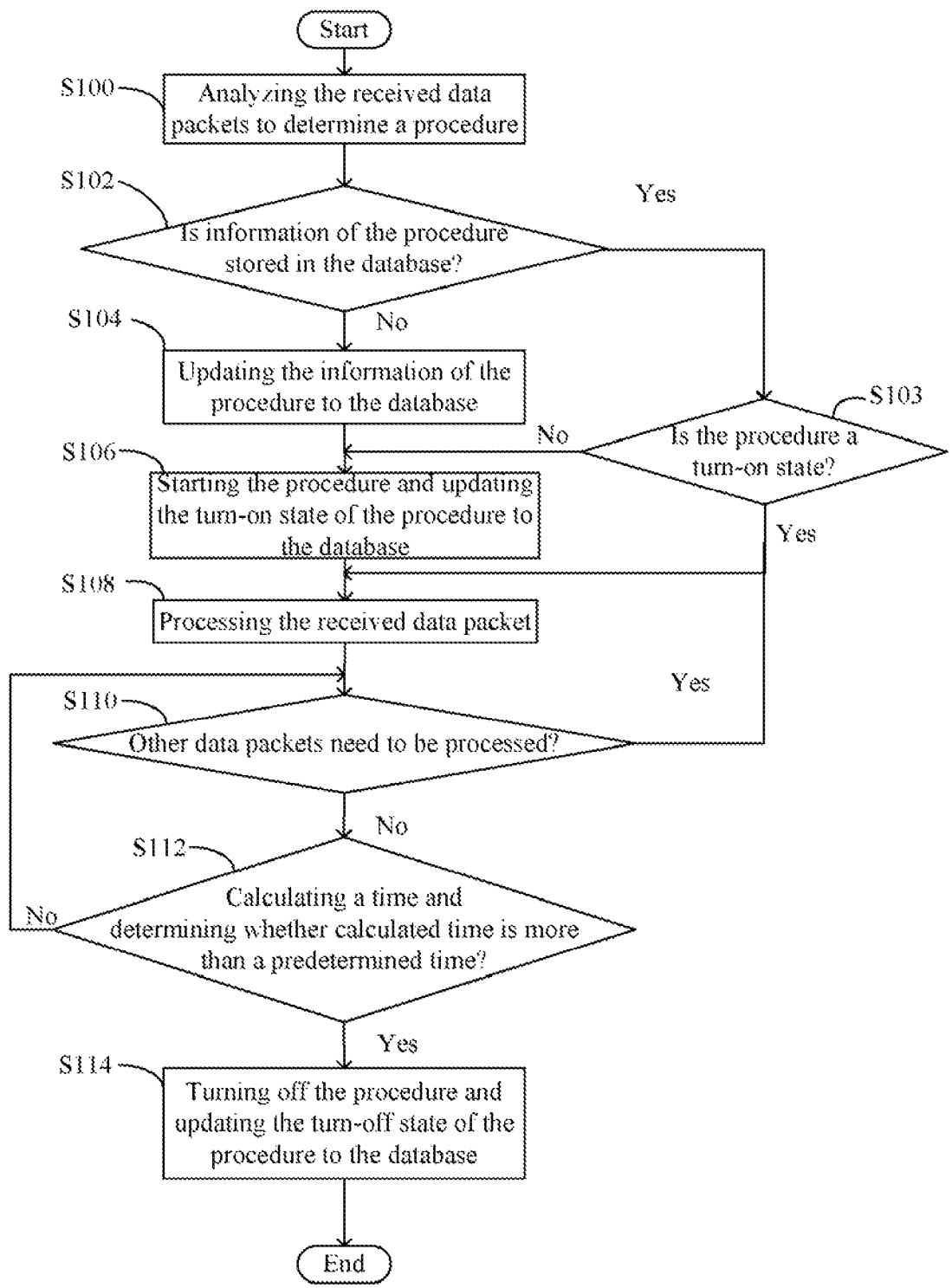
FIG. 3 is a flowchart of one embodiment of a dynamic management method for processing data packets using a network device.

FIG. 3 is a flowchart of one embodiment of a dynamic management method for processing data packets using a network device 1. The network device 1 transmits and receives data packets between the network device 1 and the Internet 2. The network device 1 further set a predetermined time to determine whether the time of a procedure for processing the data packets has not been executed to process the data packets is more than the predetermined time. Depending on the embodiment, additional blocks may be added, others deleted, and the ordering of the blocks may be changed.

In block S100, the analysis module 50 analyzes information of the data packets to determine a procedure for processing the data packets. In one embodiment, the information of the data packets includes information about the procedure.

In block S102, the checking module 60 determines whether information of the procedure is stored in the database 100. In one embodiment, the checking module 60 determines whether a title of the procedure is stored in the database 100. If the checking module 60 determines the title of the procedure is stored in the database 100, block S103 is implemented. If the checking module 60 determines the title of the procedure is not stored in the database 100, block S104 is implemented.

In block S103, the checking module 60 further determines whether a status of the procedure is a turn-on state. If the status of the procedure is the turn-on state, block S108 is implemented. If the status of the procedure is not the turn-on state, block S106 is implemented.

In block S104, the update module 90 updates the information of the procedure to the database 100. For example, the update module 90 updates a title and a turn-off state of the procedure to the database 100.

In block S106, the at least one processor 30 starts the procedure and the update module 90 updates the turn-on state of the procedure to the database 100.

In block S108, the execution module 70 executes the procedure to process the data packets.

In block S110, the monitor module 40 determines whether the network device 1 receives other data packets that need to be processed. If the other data packets need to be processed, block 102 is implemented. If no other data packets need to be processed, block S112 is implemented.

In block S112, the timer module 80 calculates a time of the procedure has not been executed to process the data packets and determines whether the calculated time is more than the predetermined time. If the calculated time is more than the predetermined time, block S114 is implemented. If the calculated time is not more than the predetermined time, block S110 is implemented.

In block S114, the procedure is turned off by the at least one processor 30 and the update module 90 updates the turn-off state of the procedure to the database 100.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A network device, comprising:
   a transmission unit operable to transmit and receive data packets across a network;
   a storage unit operable to store a database;
   at least one processor;
   one or more programs that are stored in the storage unit and are executed by the at least one processor, the one or more programs comprising:
   a monitor module operable to monitor a receiving status of the transmission unit;
   an analysis module operable to analyze information of the data packets to determine a procedure needed in order to process the data packets;
   a checking module operable to determine whether information of the procedure is stored in the database, wherein the information of the procedure comprises a title and a status of the procedure, and the status of the procedure comprises a turn-on state of the procedure and a turn-off state of the procedure;
   an execution module operable to execute the procedure to process the data packets according to the status of the procedure; and
   a timer module operable to set a predetermined time, calculate a time of the procedure that has not been executed to process the data packets, and determine whether the calculated time is more than the predetermined time.

2. The network device of claim 1, the one or more programs further comprising:
   an update module operable to update the information of the procedure to the database.

3. The network device of claim 2, wherein the update module updates the turn-on state of the procedure to the database when the execution module executes the procedure.

4. The network device of claim 2, wherein the update module updates the turn-off state of the procedure to the database when the procedure is turned off.

5. The network device of claim 1, wherein the monitor module further determines whether the network device receives the data packets needed to be processed.

6. The network device of claim 1, wherein the procedure is turned off if the calculated time is more than the predetermined time.

7. A dynamic management method for processing data packets using a network device, the network device comprising a storage unit storing a database and at least one processor, the method comprising:
   analyzing information of data packets to determine a procedure needed in order to process the data packets;

determining whether information of the procedure is stored in the database, wherein the information of the procedure comprises a title and a status of the procedure, and the status of the procedure comprises a turn-on state of the procedure and a turn-off state of the procedure;

updating the information of the procedure to the database if the procedure is not stored in the database;

starting the procedure by the at least one processor;

updating the turn-on state of the procedure to the database;

executing the procedure to process the data packets according to the status of the procedure;

determining whether other data packets that need to be processed;

calculating a time of the procedure has not been executed to process the data packets if no other data packets need to be processed and determining whether the calculated time is more than a predetermined time; and turning off the procedure if the calculated time is more than the predetermined time and updating the turn-off state of the procedure to the database.

8. The method of claim 7, further comprising setting the predetermined time to save in the storage unit.

9. The method of claim 7, further comprising:

determining whether the status of the procedure is the turn-on state if the procedure is stored in the database.

10. The method of claim 7, further comprising:

executing the determining step of whether the network device receives the data packets which need to be processed if the calculated time is not more than the predetermined time.

11. A non-transitory computer readable medium storing a set of instructions, the set of instructions being executed by at least one processor of a network device, causing the network device to execute a dynamic management method for processing data packets, the network device comprising a storage unit storing a database and at least one processor, the method comprising:

analyzing information of data packets to determine a procedure needed in order to process the data packets;

determining whether information of the procedure is stored in the database, wherein the information of the procedure comprises a title and a status of the procedure, and the status of the procedure comprises a turn-on state of the procedure and a turn-off state of the procedure;

updating the information of the procedure to the database if the procedure is not stored in the database;

starting the procedure by the at least one processor;

updating the turn-on state of the procedure to the database;

executing the procedure to process the data packets according to the status of the procedure;

determining whether other data packets that need to be processed;

calculating a time of the procedure has not been executed to process the data packets if no other data packets need to be processed and determining whether the calculated time is more than a predetermined time; and turning off the procedure if the calculated time is more than the predetermined time and updating the turn-off state of the procedure to the database.

12. The non-transitory computer readable medium of claim 11, wherein the method further comprises:

setting the predetermined time to save in the storage unit.

13. The non-transitory computer readable medium of claim 11, wherein the method further comprises:

determining whether the status of the procedure is the turn-on state if the procedure is stored in the database.

14. The non-transitory computer readable medium of claim 11, wherein the method further comprises:

executing the determining step of whether the network device receives the data packets which need to be processed if the calculated time is not more than the predetermined time.

\* \* \* \* \*